(No Model.)
G. GILLIES.
SPRING TOOTH HARROW.
No. 395,699. Patented Jan. 8, 1889.
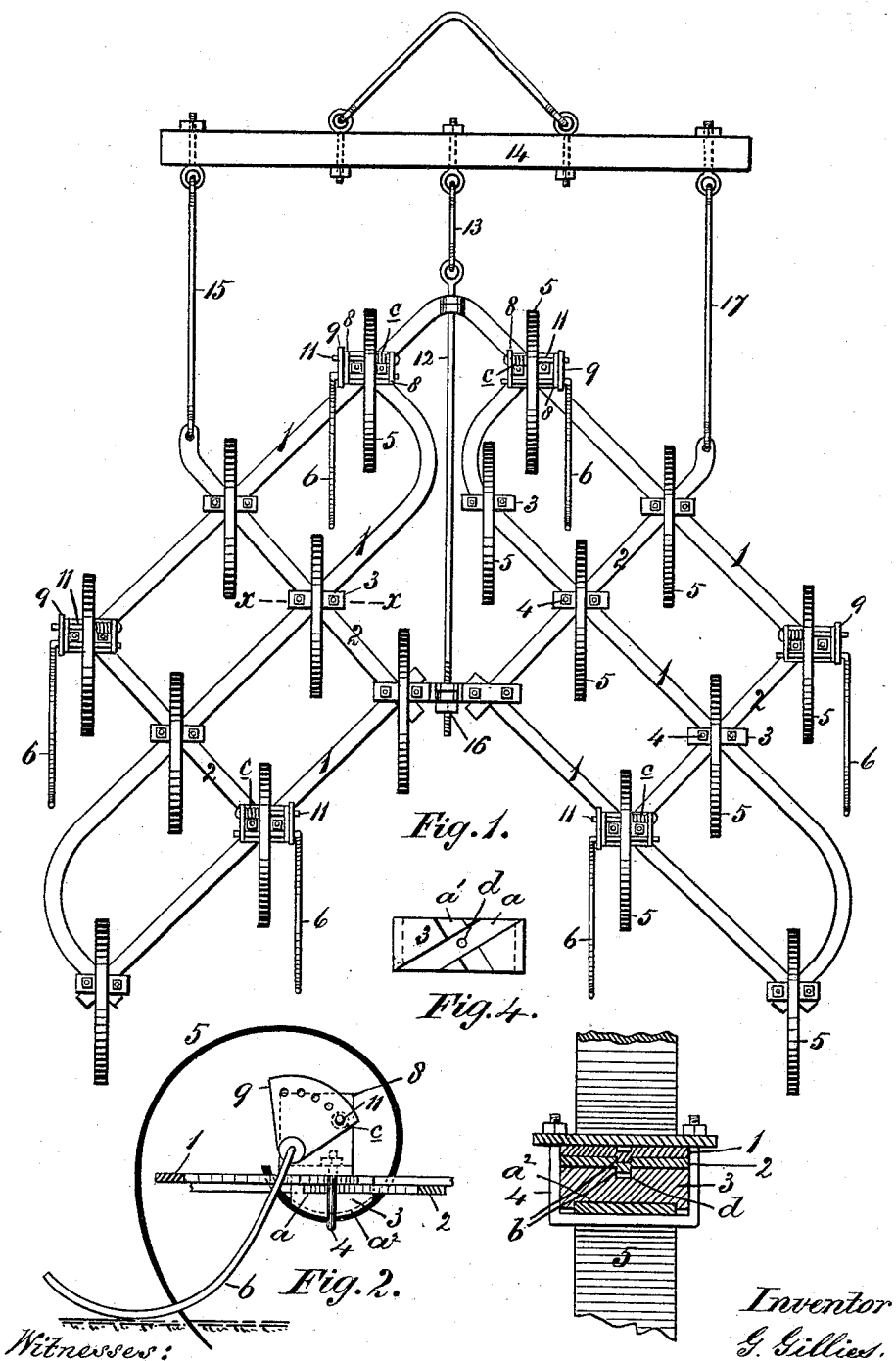

UNITED STATES PATENT OFFICE.

GEORGE GILLIES, OF GANANOQUE, ONTARIO, CANADA.

SPRING-TOOTH HARROW.

SPECIFICATION forming part of Letters Patent No. 395,699, dated January 8, 1889.

Application filed July 18, 1888. Serial No. 280,295. (No model.) Patented in Canada February 1, 1888, No. 28,430.

*To all whom it may concern:*

Be it known that I, GEORGE GILLIES, of Gananoque, in the County of Leeds and Province of Ontario, in the Dominion of Canada, have invented certain new and useful Improvements in Spring-Tooth Harrows, (for which I have obtained a patent of the Dominion of Canada, No. 28,430, dated the 1st day of February, 1888;) and I do hereby declare that the following is a full, clear, and exact description of the same, reference being had to the accompanying drawings, in which—

Figure 1 is a plan of my improved harrow. Fig. 2 is a side view of the adjustable runner or shoe and tooth-holder enlarged. Fig. 3 is a section of the intersecting bars of the harrow-frame, tooth-holder, and clip on line X X, Fig. 1, enlarged; and Fig. 4 is a plan of the tooth-holder detached.

My invention has for its objects to increase the strength of the harrow-sections and diminish their weight by improved connection of the longitudinal bars; to prevent movement of the intersecting bars and tooth-holder should the clip slightly loosen, whereby the harrow-sections will not tip or cant, but run even with the ground, and to increase the efficiency of the harrow, whereby the depth of penetration of the teeth is regulated by a series of adjustable runners or shoes sliding on the surface of the ground.

My invention consists in the means and contrivances hereinafter described, and indicated in the claims.

1 are the longitudinal and 2 the transverse bars of the harrow-sections. These bars rest in intersecting grooves $a\ a'$ in a tooth-holder, 3, which has a groove, $a^2$, on the opposite side and shaped to coincide with the curved heel of the tooth 5, and said harrow-bars, tooth-holder, and tooth are clamped together by a clip, 4.

To prevent the tooth-holder and harrow-bars from separating should the nuts of the clip slightly slacken, the bars at their intersection are provided with half-punched holes to make coinciding indentation on one side and a projecting teat, $b$, on the opposite side to fit into an indentation, $d$, in the tooth-holder, and the teat of one bar fits into the indentation of the other bar, as shown in Fig. 3, so that the harrow-bars and tooth-holder will continue locked should the clip loosen by the nuts slightly unscrewing.

6 are runners or shoes distributed throughout the harrow and occupy such position as shall balance the jointed sections of the harrow at any desired distance from the ground. The runners consist of a bar curved at the lower end to pass over obstructions on the ground, and the upper end bent laterally to a square angle and journaled horizontally in a U-shaped bearing, 8, secured to the top of the harrow-frame by the legs of the clips passing upwardly through the bottom of the bearing. The journaled arm of the runner or shoe is provided with a quadrant, 9, immediately outside of bearing 8, and said quadrant has holes to receive the end of a bolt, 11, which slides in holes in the vertical sides of the bearing, and is projected into one of said holes in the quadrant by a spiral spring, C, surrounding the bolt, so that by retracting the bolt from the quadrant the foot of the runner may be adjusted higher or lower to regulate the penetration of the teeth in the soil and be locked at the desired position by the bolt shooting into the coinciding hole in the quadrant.

The middle longitudinal bar of the harrow-sections is S-shaped, the ends being bent in opposite directions and clamped to the outer longitudinal bars by the tooth-holder and clip, as before described.

The harrow-sections are connected by a hinge-joint, of which 12 is the pintle, and said pintle forms the center draft of the harrow, and is connected by a link, 13, to the middle of draft-bar 14. The ends of bar 14 are connected to the harrow-sections by rods 15 17, and form the side draft. The rear or tail end of the center draft-bar, 12, is provided with a screw and nut, 16, so that by turning the nut the center draft may be lengthened or shortened to equalize the center draft to that of the side draft, and thereby prevent the harrow-sections rising at the joint-connection by undue strain on the side draft, or the outer sides of the sections rising from the ground by undue strain on the side draft.

I claim as my invention—

1. A harrow composed of two sections hinged together in line with the draft, each section comprising front and rear parallel straight bars of approximately uniform length and diagonal to the draft, an intervening S-shaped bar having a straight portion parallel to said bars, one end of said bar intersecting the front bar near its forward end, the other end intersecting the rear bar at its rearward end, transverse bars at right angles from the forward end of the rear bar to the front bar, and the rearward end of the front bar to the rear bar, and clips connecting all the bars at their intersections to spring-teeth, substantially as described.

2. The adjustable runners 6, curved at the lower end and having a laterally square bent upper end provided with a quadrant, 9, having holes therein and journaled in a U-shaped bearing, 8, clipped to the harrow-bars and tooth-holder, said bearing provided with a spring-bolt, 11, engaging the holes in the quadrant and locking the runner at an adjusted position, as set forth.

3. The harrow-bars 1 2, having a coinciding indentation and projecting teat, $b$, and the tooth-holder 3, having an indentation, $d$, coinciding with said teat, in combination with a tooth, 5, and clip 4, as set forth.

In witness whereof I have subscribed my name, in the presence of the two undersigned witnesses, this 3d day of July, 1888.

GEO. GILLIES.

Witnesses:
B. O. BRITTON,
FRED HEASLIP.